(12) United States Patent
Botha et al.

(10) Patent No.: US 12,062,462 B2
(45) Date of Patent: Aug. 13, 2024

(54) THERMAL POWER CONVERSION SYSTEMS INCLUDING HEAT PIPES AND PHOTOVOLTAIC CELLS

(71) Applicant: NuScale Power, LLC, Portland, OR (US)

(72) Inventors: Frederick Botha, Corvallis, OR (US); Steven Mirsky, Greenbelt, MD (US); Kaeley Stevens, Corvallis, OR (US); Michele Walden, Portland, OR (US)

(73) Assignee: NuScale Power, LLC, Corvallis, OR (US)

( * ) Notice: Subject to any disclaimer, the term of this patent is extended or adjusted under 35 U.S.C. 154(b) by 319 days.

(21) Appl. No.: 17/404,607

(22) Filed: Aug. 17, 2021

(65) Prior Publication Data
US 2022/0051825 A1 Feb. 17, 2022

Related U.S. Application Data

(60) Provisional application No. 63/175,428, filed on Apr. 15, 2021, provisional application No. 63/066,532, filed on Aug. 17, 2020.

(51) Int. Cl.
*G21D 7/04* (2006.01)
*G21C 15/257* (2006.01)

(52) U.S. Cl.
CPC ............. *G21D 7/04* (2013.01); *G21C 15/257* (2013.01)

(58) Field of Classification Search
CPC .......... G21C 15/257; G21D 7/00; G21D 7/04; H02S 10/30; H02S 10/40; H02S 40/40; H02S 40/42
See application file for complete search history.

(56) References Cited

U.S. PATENT DOCUMENTS 1,690,108 A 11/1928 Grady
3,116,212 A 12/1963 Lindberg, Jr.
(Continued)

FOREIGN PATENT DOCUMENTS

CA 776219 A 1/1968
CN 104759627 A 7/2015
(Continued)

OTHER PUBLICATIONS

Datas, A., and A. Martí. "Thermophotovoltaic energy in space applications: Review and future potential." Solar Energy Materials and Solar Cells 161 (2017): 285-296. (Year: 2017).*
(Continued)

*Primary Examiner* — Sharon M Davis
(74) *Attorney, Agent, or Firm* — Lee & Hayes, P.C.

(57) ABSTRACT

Power generation systems, such as nuclear power generation systems, are described herein. A representative power generation system includes a heat source, a heat pipe, and a thermophotovoltaic cell. The heat pipe includes a first region and a second region. The first region is positioned to absorb heat from the heat source, and the second region is positioned to radiate at least a portion of the absorbed heat away from the heat pipe as thermal radiation. The thermophotovoltaic cell is positioned to receive the thermal radiation from the second region of the heat pipe and to convert at least a portion of the thermal radiation to electrical energy. The power generation system can further include another heat pipe positioned to remove waste heat from the thermophotovoltaic cell.

18 Claims, 8 Drawing Sheets

(56) References Cited

U.S. PATENT DOCUMENTS

| | | | |
|---|---|---|---|
| 3,152,260 A | 10/1964 | Cummings | |
| 3,285,822 A | 11/1966 | Tunstall | |
| 3,302,042 A * | 1/1967 | Grover | G21D 7/04 |
| | | | 976/DIG. 188 |
| 3,449,208 A | 6/1969 | Balent et al. | |
| 4,082,863 A | 4/1978 | Dancy et al. | |
| 4,245,380 A | 1/1981 | Maxson | |
| T101,204 I4 | 11/1981 | Hampel | |
| 4,327,443 A | 4/1982 | Cotton | |
| 4,419,532 A * | 12/1983 | Severns | F24S 60/00 |
| | | | 136/253 |
| 4,632,179 A | 12/1986 | Meijer et al. | |
| 4,755,350 A | 7/1988 | Kennel | |
| 4,851,183 A | 7/1989 | Hampel | |
| 4,903,761 A | 2/1990 | Cima | |
| 5,117,901 A | 6/1992 | Cullimore | |
| 5,195,575 A | 3/1993 | Wylie | |
| 5,647,429 A | 7/1997 | Oktay et al. | |
| 5,684,848 A | 11/1997 | Gou et al. | |
| 5,932,885 A | 8/1999 | Debellis et al. | |
| 6,353,651 B1 | 3/2002 | Gou et al. | |
| 8,073,096 B2 | 12/2011 | El-Genk et al. | |
| 9,824,890 B2 | 11/2017 | Young et al. | |
| 10,192,740 B2 | 1/2019 | Young et al. | |
| 10,643,756 B2 | 5/2020 | Mcclure et al. | |
| 10,903,389 B2 | 1/2021 | Schulte et al. | |
| 10,910,116 B2 | 2/2021 | Mckellar | |
| 11,158,432 B1 | 10/2021 | Reid et al. | |
| 2003/0141045 A1 | 7/2003 | Oh et al. | |
| 2010/0040187 A1 | 2/2010 | Ahlfeld et al. | |
| 2010/0119027 A1 | 5/2010 | Peterson | |
| 2010/0177860 A1 | 7/2010 | Eoh et al. | |
| 2010/0212656 A1 | 8/2010 | Qiu et al. | |
| 2012/0051481 A1 | 3/2012 | Shu | |
| 2014/0348287 A1 | 11/2014 | Huke et al. | |
| 2015/0246394 A1 | 9/2015 | Lancaster-Larocque et al. | |
| 2016/0290235 A1 | 10/2016 | Ekanayake et al. | |
| 2016/0293281 A1 | 10/2016 | Katono et al. | |
| 2018/0033501 A1 | 2/2018 | Kimura et al. | |
| 2018/0075931 A1 | 3/2018 | Arafat et al. | |
| 2018/0224215 A1 | 8/2018 | Thiers et al. | |
| 2018/0226159 A1 | 8/2018 | Sterbentz et al. | |
| 2018/0268948 A1 | 9/2018 | Kimura et al. | |
| 2018/0268950 A1 | 9/2018 | Mckellar | |
| 2021/0065921 A1 | 3/2021 | Kimura et al. | |
| 2021/0110940 A1 | 4/2021 | Botha et al. | |

FOREIGN PATENT DOCUMENTS

| | | |
|---|---|---|
| CN | 111128413 A | 5/2020 |
| EP | 3406094 A1 | 11/2018 |
| GB | 1197880 A | 7/1970 |
| JP | H07294174 A | 11/1995 |
| RU | 2650885 C1 | 4/2018 |
| WO | 9708483 A2 | 3/1997 |
| WO | 2009049397 A1 | 4/2009 |
| WO | 2010019199 A1 | 2/2010 |

OTHER PUBLICATIONS

Jakhar, Sanjeev, M. S. Soni, and Nikhil Gakkhar. "Historical and recent development of concentrating photovoltaic cooling technologies." Renewable and Sustainable Energy Reviews 60 (2016): 41-59. (Year: 2016).*

Anderson, J. et al. Reactivity Control of Fast-Spectrum Reactors by Reversible Hydriding of Yttrium Zones. NASA Technical Note D-4615, 1968. 37 pages.

Greenspan, E. "Solid-Core Heat-Pipe Nuclear Battery Type Reactor" University of California at Berkeley, Department of Nuclear Engineering, Sep. 30, 2008. 109 pages.

ISA, International Search Report and Written Opinion for International Application No. PCT/US2020/055822. Mail Date: Apr. 23, 2021. 19 pages.

ISA, International Search Report and Written Opinion for International Application No. PCT/US2021/046253. Mail Date: Dec. 9, 2021. 8 pages.

ISA, International Search Report and Written Opinion for International Application No. PCT/US2021/046265. Mail Date: Feb. 18, 2022. 10 pages.

ISA, International Search Report and Written Opinion for International Patent Application No. PCT/US2020/055819. Mail Date: Mar. 5, 2021. 15 pages.

Peterson, G.P. "Introduction to Heat Pipe: Modeling, Testing, and Applications: 1st Edition" Wiley & Sons, Inc. 1994, pp. 44-76.

Rohsenow, W. et al. "Handbook of Heat Transfer: 3rd Edition" McGraw Hill, 2008, pp. 12.1- 12.20.

Sterbentz, J. et al. (2017) Special Purpose Nuclear Reactor (5MW) for Reliable Power at Remote Sites Assessment Report. Idaho National Laboratory. INL/EXT-16-40741.

Vetrano, J. (1971). Hydrides as neutron moderator and reflector materials. Nuclear Engineering and Design, 14(3), pp. 390-412.

Wikipedia, "Hydrogen-moderated self-regulating nuclear power module" retrieved May 28, 2021. 2 pages.

* cited by examiner

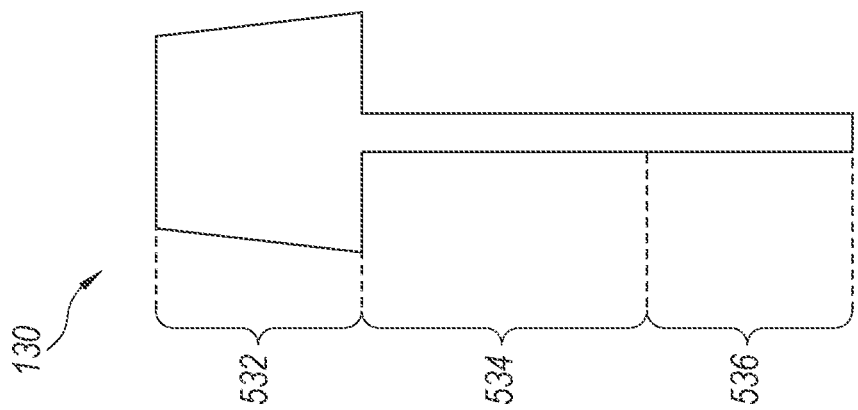
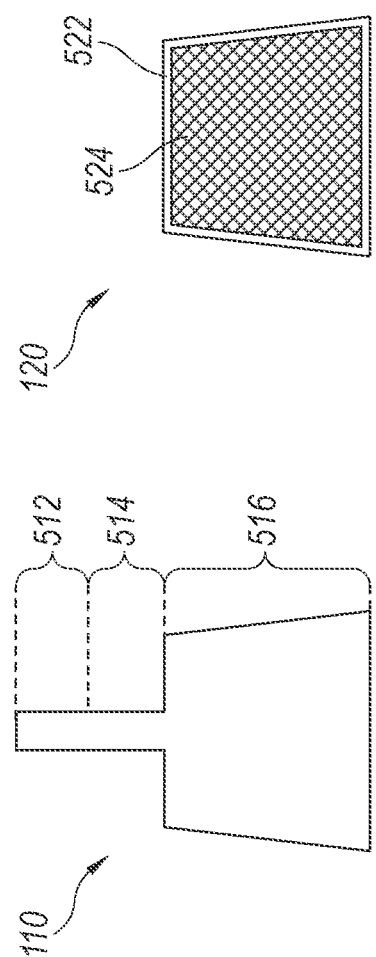
Fig. 5C
Fig. 5B
Fig. 5A

THERMAL POWER CONVERSION SYSTEMS INCLUDING HEAT PIPES AND PHOTOVOLTAIC CELLS

CROSS-REFERENCE TO RELATED APPLICATION

This application claims the benefit of U.S. Provisional Patent Application No. 63/066,532, filed Aug. 17, 2020, and titled "THERMAL POWER CONVERSION SYSTEM FOR A MICRO-REACTOR INCLUDING HEAT PIPES AND PHOTOVOLTAIC CELLS," and U.S. Provisional Patent Application No. 63/175,428, filed Apr. 15, 2021, and titled "THERMAL PHOTOVOLTAIC (TPV) DECAY HEAT REMOVAL AND/OR POWER CONVERSION SYSTEMS," each of which is incorporated herein by reference in its entirety.

TECHNICAL FIELD

The present technology is related to thermal power conversion systems including heat pipes that radiate thermal energy to photovoltaic cells, such as for use in nuclear reactor systems.

BACKGROUND

Power plants come in many different shapes and sizes. Large power plants can be used to provide electricity to a geographic area, whereas relatively small power plants can be used to power, for example, local areas, submarines, space craft, and so on. In addition to providing electricity, power plants can be used for a myriad of additional or different purposes, from desalinating seawater to creating nuclear isotopes for medical purposes. Similarly, the types of power plants that are available cover a wide spectrum of technologies including gas-powered, coal-fired, and nuclear-powered, to name a few. It is often desirable to minimize the size and weight of power plants, such for use in space applications, portable applications, and the like. At the same time, it is desirable to increase the simplicity and reliability of power plants.

BRIEF DESCRIPTION OF THE DRAWINGS

Many aspects of the present technology can be better understood with reference to the following drawings. The components in the drawings are not necessarily to scale. Instead, emphasis is placed on clearly illustrating the principles of the present technology.

FIG. 5A is a top view of a first heat pipe of the power generation system of FIG. 1, configured in accordance with embodiments of the present technology.

FIG. 5B is a top view of a thermophotovoltaic cell of the power generation system of FIG. 1, configured in accordance with embodiments of the present technology.

FIG. 5C is a top view of a second heat pipe of the power generation system of FIG. 1, configured in accordance with embodiments of the present technology.

DETAILED DESCRIPTION

Figure 1:
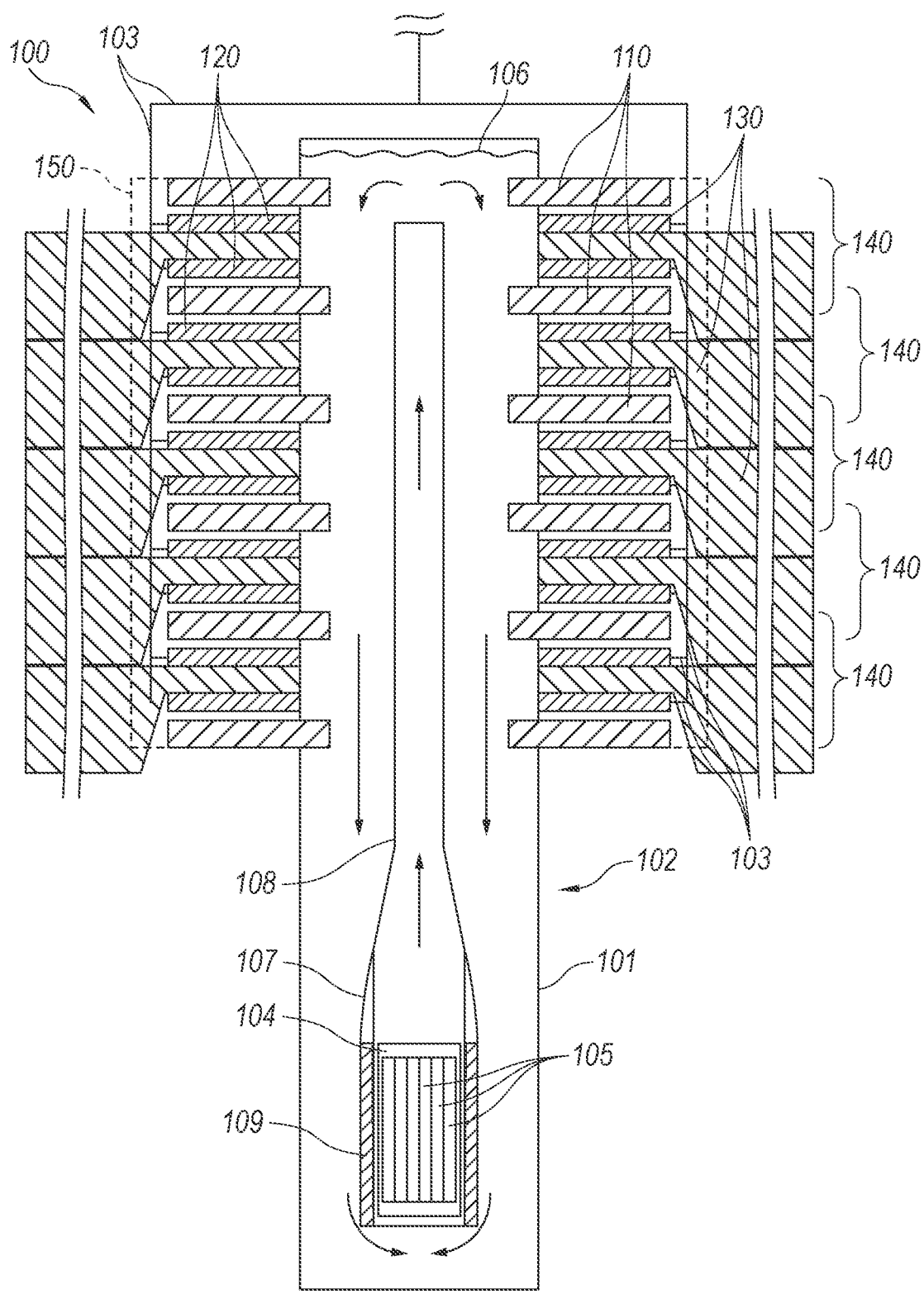
FIG. 1 is a side cross-sectional view of a power generation system configured in accordance with embodiments of the present technology.

Aspects of the present disclosure are directed generally toward power generation systems, such as nuclear power generation systems, and associated methods. In several of the embodiments described below, a representative power generation system includes a heat source, a heat pipe, and a thermophotovoltaic cell. The heat pipe includes a first region and a second region. The first region is configured to absorb heat from the heat source, and the second region is configured to radiate at least a portion of the absorbed heat away from the heat pipe as thermal radiation. The thermophotovoltaic cell is positioned to receive the thermal radiation from the second region of the heat pipe and configured to convert at least a portion of the thermal radiation to electrical energy.

In some embodiments, the heat pipe is a first heat pipe and the power generation system can further include a second heat pipe positioned to remove waste heat from the thermophotovoltaic cell. For example, the thermophotovoltaic cell can be mounted to the second pipe such that the waste heat can be conductively transferred from the thermophotovoltaic cell to the second heat pipe. The second heat pipe can eject the waste heat to a heat sink or other source. In this manner, the second heat pipe can act as a thermal management system for the thermophotovoltaic cell-removing waste heat from the thermophotovoltaic cell and maintaining the thermophotovoltaic cell at or below a maximum operating temperature.

In some embodiments, the heat pipe and the thermophotovoltaic cell comprise one of multiple groups of heat pipes and thermophotovoltaic cells. In such embodiments, the groups can be vertically and/or circumferentially arranged around the heat source to provide a compact arrangement with a large surface area for the thermophotovoltaic cells.

Certain details are set forth in the following description and in FIGS. 1-8 to provide a thorough understanding of various embodiments of the present technology. In other instances, well-known structures, materials, operations, and/or systems often associated with nuclear reactors, heat pipes, thermophotovoltaic cells, and the like, are not shown or described in detail in the following disclosure to avoid unnecessarily obscuring the description of the various embodiments of the technology. Those of ordinary skill in the art will recognize, however, that the present technology can be practiced without one or more of the details set forth herein, and/or with other structures, methods, components, and so forth. The terminology used below is to be interpreted in its broadest reasonable manner, even though it is being used in conjunction with a detailed description of certain examples of embodiments of the technology.

The accompanying Figures depict embodiments of the present technology and are not intended limit its scope unless expressly indicated. The sizes of various depicted elements are not necessarily drawn to scale, and these various elements may be enlarged to improve legibility. Component details may be abstracted in the Figures to exclude details such as position of components and certain precise connections between such components when such details are unnecessary for a complete understanding of how to make and use the present technology. Many of the details, dimensions, angles and other features shown in the Figures are merely illustrative of particular embodiments of the disclosure. Accordingly, other embodiments can have other details, dimensions, angles and features without departing from the present technology. In addition, those of ordinary skill in the art will appreciate that further embodiments of the present technology can be practiced without several of the details described below.

Figure 2:
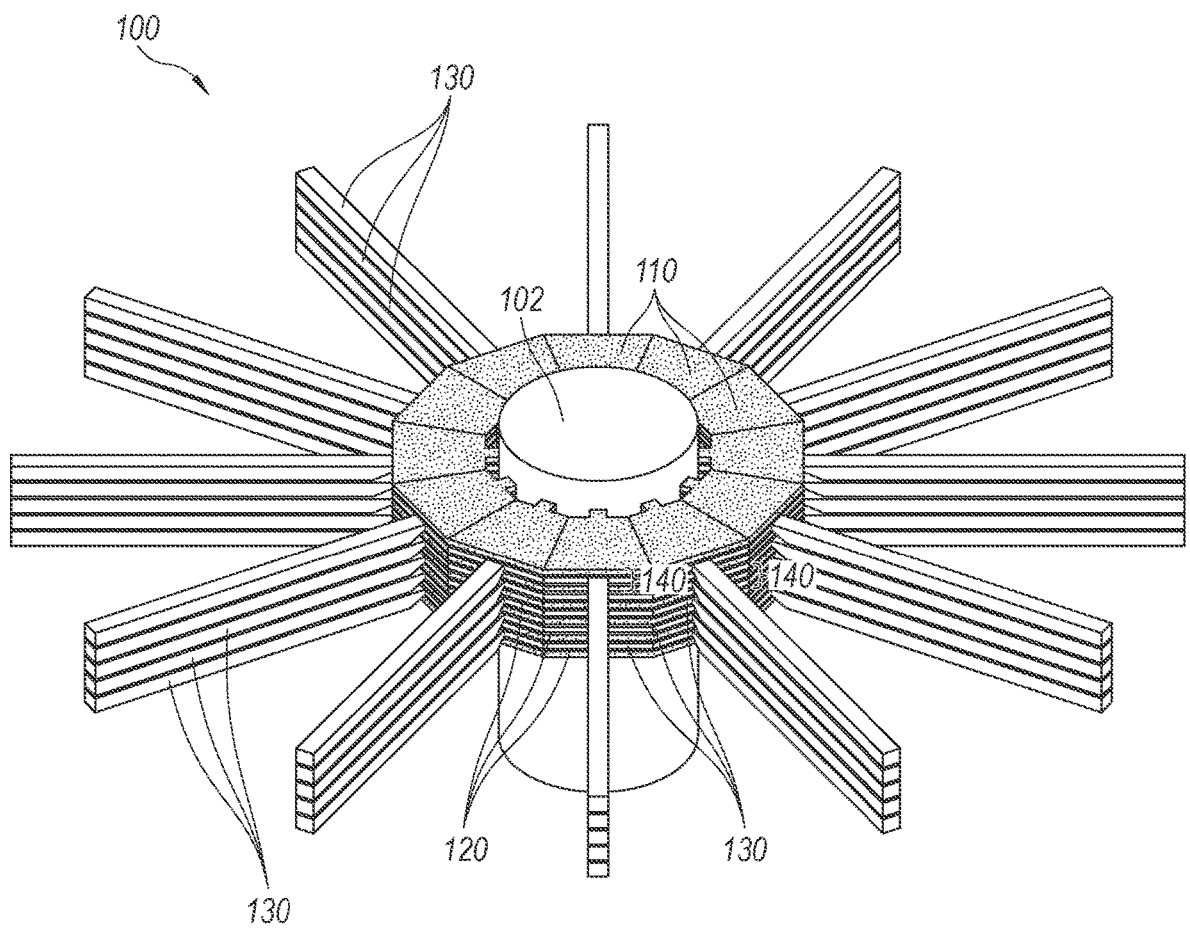
FIG. 2 is an isometric view of the power generation system of Figure.
Figure 3:
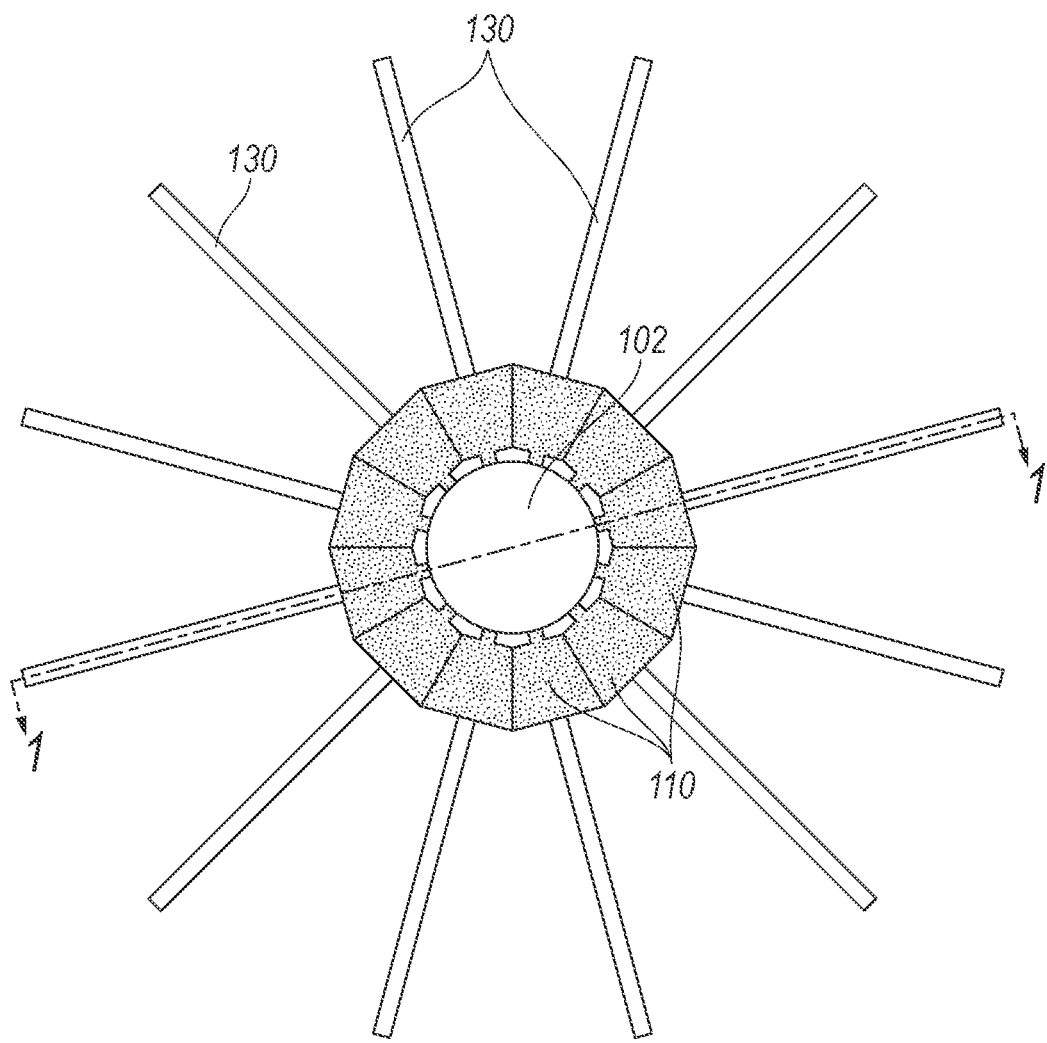
FIG. 3 is a top view of the power generation system of FIG. 1.
Figure 4:
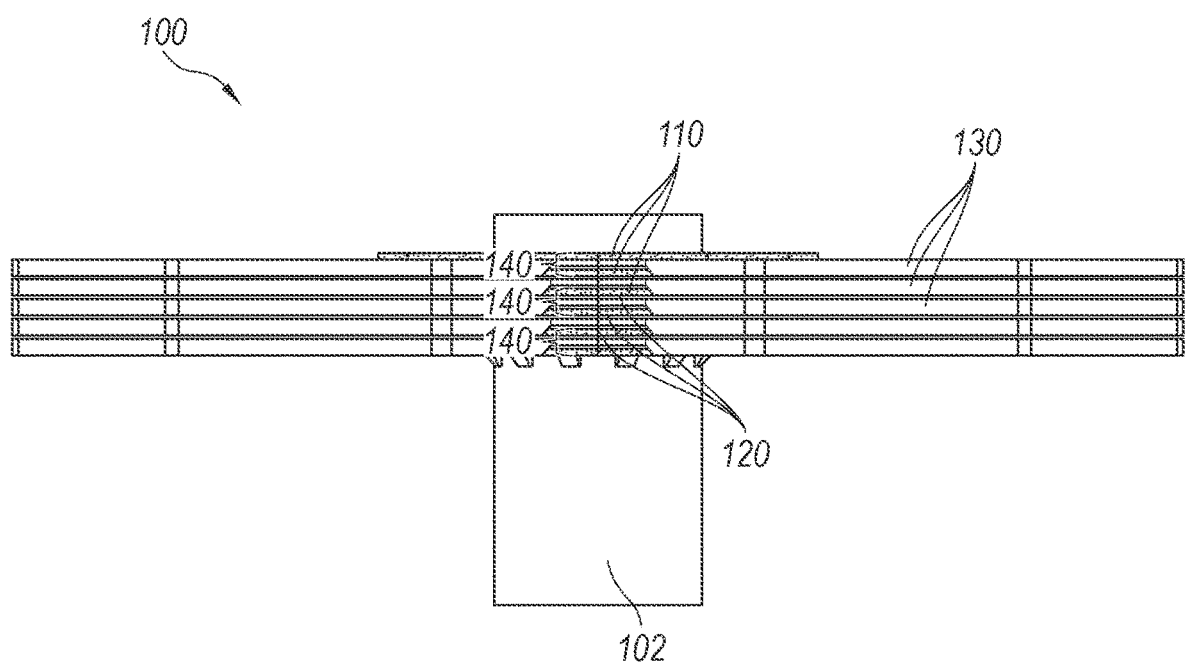
FIG. 4 is a side view of the power generation system of FIG. 1.

FIG. 1 is a side cross-sectional view of a power generation system ("system 100") configured in accordance with embodiments of the present technology. FIGS. 2-4 are an isometric view, a top view, and a side view, respectively, of the system 100. Referring to FIGS. 1-4 together, the system 100 can include a heat source 102 and a plurality of first heat pipes 110 thermally coupled to the heat source 102. The first heat pipes 110 are configured to remove heat from the heat source 102 and to radiate the heat toward a plurality of thermophotovoltaic (TPV) or photovoltaic (PV) panels or cells 120. The TPV cells 120 are positioned to absorb the thermal radiation from the first heat pipes 110 and configured to convert the thermal radiation to electrical energy for transmission on one or more electrical lines 103 (FIG. 1). In the illustrated embodiment, the system 100 further includes a plurality of second heat pipes 130 thermally coupled to the TPV cells 120 and configured to remove waste heat from the TPV cells 120 to thereby maintain the TPV cells 120 at or below a maximum operating temperature.

In some embodiments, as shown in FIG. 1, the heat source 102 can be a nuclear reactor system ("nuclear reactor 102"). Referring to FIG. 1, the nuclear reactor 102 can include a reactor vessel 101 that houses a reactor core 104 in which a controlled nuclear reaction takes place. In the illustrated embodiment, the reactor vessel 101 is cylinder-shaped or capsule-shaped (e.g., having a circular cross-sectional shape) while, in other embodiments, the reactor vessel 101 can be spherical, conical, or other shapes and/or can have other cross-sectional shapes (e.g., oval, rectilinear, rectangular, polygonal, irregular). The reactor core 104 can include one or more fuel assemblies 105 including fissile and/or other suitable materials. In some embodiments, the nuclear reactor 102 can include a reflector 109 positioned around the reactor core 104 that directs neutrons back into the reactor core 104 to further the nuclear reaction taking place therein.

In some embodiments, the reactor vessel 101 can further house a working fluid or coolant 106 (e.g., a primary coolant) that conveys heat from the reactor core 104 to the first heat pipes 110. For example, as illustrated by arrows located within the reactor vessel 101, the coolant 106 is heated at the reactor core 104 toward a bottom of the reactor vessel 101. The heated primary coolant (e.g., water with or without additives, liquid metal) rises from the reactor core 104 through a core shroud 107 and to a riser tube 108. The hot, buoyant coolant 106 continues to rise through the riser tube 108, then exits the riser tube 108 and passes downwardly past the first heat pipes 110. As the coolant 106 descends pass the first heat pipes 110, the coolant 106 transfers heat to first heat pipes 110, and then descends to the bottom of the reactor vessel 101 where the cycle begins again. Accordingly, the cycle can be driven by the changes in the buoyancy of the coolant 106, thus reducing or eliminating the need for pumps, valves, or other active fluid control devices to move the coolant 106.

The nuclear reactor 102 can further include multiple control systems and associated sensors (not shown). For example, the nuclear reactor 102 can include one or more control rods, a liquid moderator, and/or other components for controlling a reaction rate of the fissile material within the reactor core 104. In some embodiments, the coolant 106 can be omitted and the first heat pipes 110 can be directly thermally coupled to the reactor core 104. For example, a nuclear fuel can be directly thermally coupled to (e.g., attached to) the first heat pipes 110. In some embodiments, the nuclear reactor 102 can include some features similar or identical to, and/or can operate similarly or identically to, any of the nuclear reactor systems described in detail in (i) U.S. patent application Ser. No. 17/071,838, titled "HEAT PIPE NETWORKS FOR HEAT REMOVAL, SUCH AS HEAT REMOVAL FROM NUCLEAR REACTORS, AND ASSOCIATED SYSTEMS AND METHODS," and filed Oct. 15, 2020, (ii) U.S. patent application Ser. No. 17/071,795, titled "NUCLEAR REACTORS HAVING LIQUID METAL ALLOY FUELS AND/OR MODERATORS," filed Oct. 15, 2020, and/or (iii) U.S. patent application Ser. No. 17/168,118, titled "SUPPORTS WITH INTEGRATED SENSORS FOR NUCLEAR REACTOR STEAM GENERATORS, AND ASSOCIATED SYSTEMS AND METHODS," and filed Feb. 4, 2021, each of which is incorporated herein by reference in its entirety.

With continued reference to FIG. 1, the first heat pipes 110, the TPV cells 120, and the second heat pipes 130 can be vertically arranged (e.g., stacked) in a plurality of groups 140 (e.g., layers, sets). In the illustrated embodiment, there are five of the groups 140 in the vertical direction and each of the groups 140 includes (i) two of the first heat pipes 110, (ii) two of the TPV cells 120, and (iii) one of the second heat pipes 130. In some embodiments, the groups 140 can at least partially overlap such that, for example, each of the groups 140 shares at least one of the first heat pipes 110 with another one of the groups 140. Accordingly, pairs of the TPV cells 120 can be vertically interleaved between the first heat pipes 110, and the second heat pipes 130 can be vertically interleaved between the TPV cells 120 in each pair. In each of the groups 140, one of the TPV cells 120 can face one of the first heat pipes 110 and the other one of the TPV cells 120 can face the other one of the first heat pipes 110.

With additional reference to FIGS. 2-4, multiple ones of the groups 140 can be arranged circumferentially about the heat source 102 as well as vertically about the heat source 102. As best seen in FIG. 2, for example, twelve of the groups 140 are circumferentially arranged about the heat source 102 at each vertical elevation such that the system 100 includes a total of 60 (12 x 5) of the groups 140. In other embodiments, the number of the groups 140 in the vertical and/or circumferential direction can be different, and/or the groups 140 can include more or fewer of the first heat pipes 110, the TPV cells 120, and/or the second heat pipes 130. Moreover, while the first heat pipes 110, the second heat pipes 130, and the TPV cells 120 are illustrated as extending generally horizontal to (e.g. orthogonal to) a longitudinal axis of the heat source 102, in other embodiments one or more of the first heat pipes 110, the second heat pipes 130, and/or the TPV cells 120 can extend vertically relative to (e.g., parallel) to the longitudinal axis and/or at another angle relative to the longitudinal axis.

In some embodiments, the first heat pipes 110 can be generally similar or identical to one another, the TPV cells 120 can be generally similar or identical to one another, and/or the second heat pipes 130 can be generally similar or identical to one another. FIGS. 5A-5C, for example, are top views of one of the first heat pipes 110, one of the TPV cells 120, and one of the second heat pipes 130, respectively, in accordance with embodiments of the present technology.

Referring to FIG. 5A, each of the first heat pipes 110 ("the first heat pipe 110") can include a first region 512 (e.g., an evaporator region), a second region 514 (e.g., an adiabatic region) extending from the first region 512, and a third region 516 (e.g., a condenser region) extending from the second region 514 (collectively "regions 512-516"). In the illustrated embodiment, the first and second regions 512, 514 have an elongate rectangular shape while the third region 516 has a trapezoidal shape. In some embodiments, the third region 516 has a greater surface area than the first and second regions 512, 514. In other embodiments, the sizes, shapes, and/or dimensions of the regions 512-516 can be different. For example, the third region 516 can be rectangular.

Referring to FIG. 5B, each of the TPV cells 120 ("the TPV cell 120") can have a trapezoidal shape and can be sized and shaped to generally match the third region 516 of the first heat pipe 110. Some, substantially all, or all of an upper surface 522 of the TPV cell 120 can be covered with circuitry 524, such as photovoltaic diodes, for converting thermal energy to electrical energy. A lower surface of the TPV cell 120 (obscured in FIG. 5B) can include a thermally conductive material for facilitating waste heat removal from the TPV cell 120 (e.g., to the second heat pipes 130 as described in greater detail below).

Referring to FIG. 5C, similar to the first heat pipe 110 illustrated in FIG. 5A, each of the second heat pipes 130 ("the second heat pipe 130") can include a first region 532 (e.g., an evaporator region), a second region 534 (e.g., an adiabatic region) extending from the first region 532, and a third region 536 (e.g., a condenser region) extending from the second region 534 (collectively "regions 532-536"). In the illustrated embodiment, the second and third regions 534, 536 have an elongate rectangular shape while the first region 532 has a trapezoidal shape. In some embodiments, the first region 532 has a greater surface area than the first and second regions 534, 536. With additional reference to FIGS. 1-4, in some embodiments the second and third regions 534 can have a greater thickness (e.g., along a longitudinal axis of the heat source 102) than the first region 532, which can have a greater width (e.g., along a radial axis perpendicular to the longitudinal axis). In other embodiments, the sizes, shapes, and/or dimensions of the regions 532-536 can be different. For example, the third region 536 can be rectangular.

Referring to FIGS. 5A-5C together, in some embodiments the sizes and shapes (e.g., planform size and shape) of the third region 516 of the first heat pipe 110, the TPV cell 120, and the first region 532 of the second heat pipe 130 can be generally similar or identical. As described in greater detail below, these components can be vertically superimposed over another to provide a compact arrangement.

In some embodiments the first and second heat pipes 110, 130 can have general similar or identical constructions and/or can operate generally similarly or identically. For example, the first and second heat pipes 110, 130 can each include an outer casing defining a channel (e.g., cavity, chamber) containing a working fluid. The channel of the first heat pipe 110 can extend from the first region 512 through the second region 514 to the third region 516, and the channel of the second heat pipe 130 can extend from the first region 532 through the second region 534 to the third region 536.

The working fluid can be a two-phase (e.g., liquid and vapor phase) material such as, for example, sodium or potassium. In some embodiments, the casing can be formed of steel, molybdenum, molybdenum alloy, molybdenum-lanthanum oxide, and/or other metallic or ceramic materials. In some embodiments, the first and second heat pipes 110, 130 can each include structures positioned within the channels for transporting the working fluid against a pressure differential via capillary action. For example, the first and second heat pipes 110, 130 can each include a wicking structure (e.g., a compound wick) for transporting the working fluid. In some embodiments, the first and second heat pipes 110, 130 can be generally similar or identical to any of the heat pipes described in detail in U.S. patent application Ser. No. 17/071,838, titled "HEAT PIPE NETWORKS FOR HEAT REMOVAL, SUCH AS HEAT REMOVAL FROM NUCLEAR REACTORS, AND ASSOCIATED SYSTEMS AND METHODS," and filed Oct. 15, 2020, which is incorporated herein by reference in its entirety.

Referring to FIGS. 1-5C together, the first heat pipes 110 extend through the reactor vessel 101 into the heat source 102. More specifically, for each of the first heat pipes 110, the first region 512 can be positioned within the heat source 102, the third region 516 can be positioned outside the heat source 102, and the second region 514 can be positioned inside and/or outside the heat source 102. The TPV cells 120 can be mounted to corresponding ones of the second heat pipes 130, and the second heat pipes 130 can extend from the TPV cells 120 outward away from the heat source 102. More specifically, each of the TPV cells 120 can be mounted to (e.g., attached to, coupled to, thermally coupled to, carried by) a lower surface or an upper surface of the first region 532 of a corresponding one of the second heat pipes 130. The third region 516 of each of the first heat pipes 110 can be positioned over the first region 532 of an adjacent one of the second heat pipes 130 to face the circuitry 526 of a corresponding one of the TPV cells 120 mounted thereon. That is, in each of the groups 140, the third regions 516 of the first heat pipes 110, the TPV cells 120, and the first regions 532 of the second heat pipes 130 can be vertically superimposed. Accordingly, each of the TPV cells 120 can be mounted to one of the second heat pipes 130 and positioned to face the third region 516 of an adjacent (e.g., corresponding) one of the first heat pipes 110.

In some aspects of the present technology, the complementary configurations (e.g., trapezoidal shape and the same or substantially similar sizes) of the third regions 516 of the first heat pipes 110, the TPV cells 120, and the first regions 532 of the second heat pipes 130 ensure that each of the TPV cells 120 (i) faces generally or at least approximately (e.g., 90% or more of) the entire third region 516 of the adjacent one of the first heat pipes 110 and (ii) contacts generally or at least approximately (e.g., 90% or more of) the entire first region 532 of the second heat pipe 130 that the TPV cell 120 is mounted to. Moreover, as best seen in FIGS. 2 and 3, the trapezoidal shapes of the third regions 516 of the first heat pipes 110, the TPV cells 120, and the first regions 532 of the second heat pipes 130 can provide a nested arrangement that utilizes substantially the entire space around the circumference of the heat source 102—thereby providing a compact design while maximizing surface area (e.g., and a corresponding energy conversion density of the TPV cells 120).

During operation of the system 100, the heat source 102 (e.g., the circulating coolant 106) transfers heat to the first regions 512 of the first heat pipes 110. For each of the first heat pipes 110, heat absorbed at the first region 512 evaporates (e.g., vaporizes) the working fluid at/in the first region 512 and generates a pressure differential between the first region 512 and the third region 516. The pressure differential drives the evaporated working fluid from the first region 512, through the second region 514, and to the third region 516. The working fluid cools and condenses at the third region 516, thereby transferring heat to the casing of the first heat pipe 110 at the third region 516, which then radiates the heat away from the first heat pipe 110. Accordingly, heat is deposited into the first regions 512 and removed from the third regions 516 of the first heat pipes 110. In some embodiments, heat is neither removed nor added in the second regions 514. In some embodiments, each of the first heat pipes 110 can be configured to transport the condensed/cooled working fluid back against the pressure gradient from the third region 516 to the first region 512, where the working fluid can be heated and vaporized once again. For example, as described in detail above, the first heat pipes 110 can each include a wicking structure configured to pump the working fluid against the pressure gradient via capillary action. In other embodiments, the first heat pipes 110 can be arranged such that gravity and/or a centrifugal force return the cooled and condensed working fluid to the first regions 512.

The TPV cells 120 are each positioned to receive the heat radiated from the third region 516 of an adjacent one of the first heat pipes 110 in the same group 140. The circuitry 524 of the TPV cells 120 can convert the thermal radiation (e.g., received photons) to electrical energy (e.g., DC electrical power), which can be carried away from the TPV cells 120 via the electrical lines 103. In some embodiments, the electrical lines 103 can be connected to a single load or transmission path while, in other embodiments, the electrical lines 103 can route the electrical energy to separate loads and/or transmission paths. In some embodiments, as shown in FIG. 1, the system 100 can optionally include a vacuum vessel 150 (shown in phantom) at least partially around the TPV cells 120 and the first heat pipes 110. The vacuum vessel 150 can be configured to generate/maintain a vacuum or partial vacuum between the TPV cells 120 and the third regions 516 of first heat pipes 110, which radiate thermal energy toward the TPV cells 120. The vacuum can increase the amount of thermal radiation received by the TPV cells 120 from the first heat pipes 110 by, for example, minimizing the amount of dust or other contaminants that could otherwise block the radiative transmission path between the first heat pipes 110 and the TPV cells 120. Moreover, the TPV cells 120 can each be spaced apart from the adjacent one of the first heat pipes 110 by a relatively small distance to increase the efficiency of the radiation received by the TPV cells 120 and converted to electrical energy.

As the TPV cells 120 receive the thermal radiation from the first heat pipes 110, some of the radiation may not be converted to electrical energy by the circuitry 524, and may instead be absorbed as waste heat that increases the temperature of the TPV cells 120. Because the TPV cells 120 are mounted to corresponding ones of the first regions 532 of the second heat pipes 130, the TPV cells 120 can transfer (e.g., conductively transfer) the waste heat to the first regions 532 of the second heat pipes 130. For each of the second heat pipes 130, heat absorbed at the first region 532 evaporates (e.g., vaporizes) the working fluid at/in the first region 532 and generates a pressure differential between the first region 532 and the third region 536. The pressure differential drives the evaporated working fluid from the first region 532, through the second region 534, and to the third region 536. The working fluid cools and condenses at the third region 536, thereby transferring heat to the casing of the second heat pipe 130 at the third region 536 for removal from the second heat pipe 130. In this manner, the second heat pipes 130 can act as a thermal management system for the TPV cells 120—removing waste heat from the TPV cells 120 and maintaining the TPV cells 120 at or below a maximum operating temperature (e.g., at an optimal or desired operating temperature).

Accordingly, heat is deposited into the first regions 532 of the second heat pipes 130 by the TPV cells 120 and removed from the third regions 536. In some embodiments, heat is neither removed nor added in the second regions 534. In some embodiments, each of the second heat pipes 130 can be configured to transport (e.g., via capillary and/or other forces) the condensed/cooled working fluid back against the pressure gradient from the third region 536 to the first region 532, where the working fluid can be heated and vaporized once again.

In some embodiments, the second heat pipes 130 can transfer (e.g., radiatively, conductively) the waste heat to a heat sink, such as the ground (e.g., the Lunar, Martian, or Terrestrial surface), atmosphere (e.g., the Martian or Terrestrial atmosphere), or to space. In some embodiments, the heat removed by the second heat pipes 130 can used in further processes, such as processes to extract water by heating ice-containing soil. For example, at least the third regions 536 of the second heat pipes 130 can be covered in ice-containing soil so that the second heat pipes 130 eject heat to the soil. The soil can be encapsulated or covered in flexible sheeting (e.g., by bagging the soil) to capture water vapor evaporated from the soil. The soil (e.g., soil bags) can be replaced when the soil's ice content is depleted.

In some embodiments, the first heat pipes 110 are configured to operate and radiate heat at high temperatures, such as greater than 500° C., greater than 700° C., greater than 900° C., greater than 1100° C., or greater. For example, where the heat source 102 is a nuclear reactor, the coolant 106 can have a temperature of about 900° C. or greater during operation. In some embodiments, the second heat pipes 130 are configured to operate at relatively lower temperatures (e.g., corresponding to an operating temperature of the TPV cells 120), such as less than 100° C., less than 75° C., less than 50° C., between 25° C.-50° C., or lower. Accordingly, the first heat pipes 110 can be referred to as high-temperature heat pipes and the second heat pipes 130 can be referred to as low temperature heat pipes. In some embodiments, the first and second heat pipes 110, 130 can have different configurations/arrangements to maximize the heat transfer coefficient for the particular high or low operating temperature. For example, the first and second heat pipes 110, 130 can have different working fluids, sizes, wicking structures, and so on.

In some aspects of the present technology, the power conversion components of the system 100 can operate without the use of any valves or pumps. For example, the coolant 106 can be passively heated by the reactor core 104, the first heat pipes 110 can each operate as a closed fluid system for removing the heat from the coolant 106 and radiating the heat to the TPV cells 120, and the second heat pipes 130 can similarly each operate as a closed fluid system for removing waste heat from the TPV cells 120. This can reduce the complexity and associated maintenance requirements of the system 100—and thereby increase of the reliability of the system 100—compared to conventional power conversion systems, such as systems including a Brayton power generation cycle.

In other embodiments, the system 100 can have other devices or systems for removing waste heat from the TPV cells 120 in addition to or as an alternative to the second heat pipes 130. For example, a fluid (e.g., water) can be passively or actively circulated below the TPV cells 120 to cool and remove waste heat from the TPV cells 120.

Figure 6:
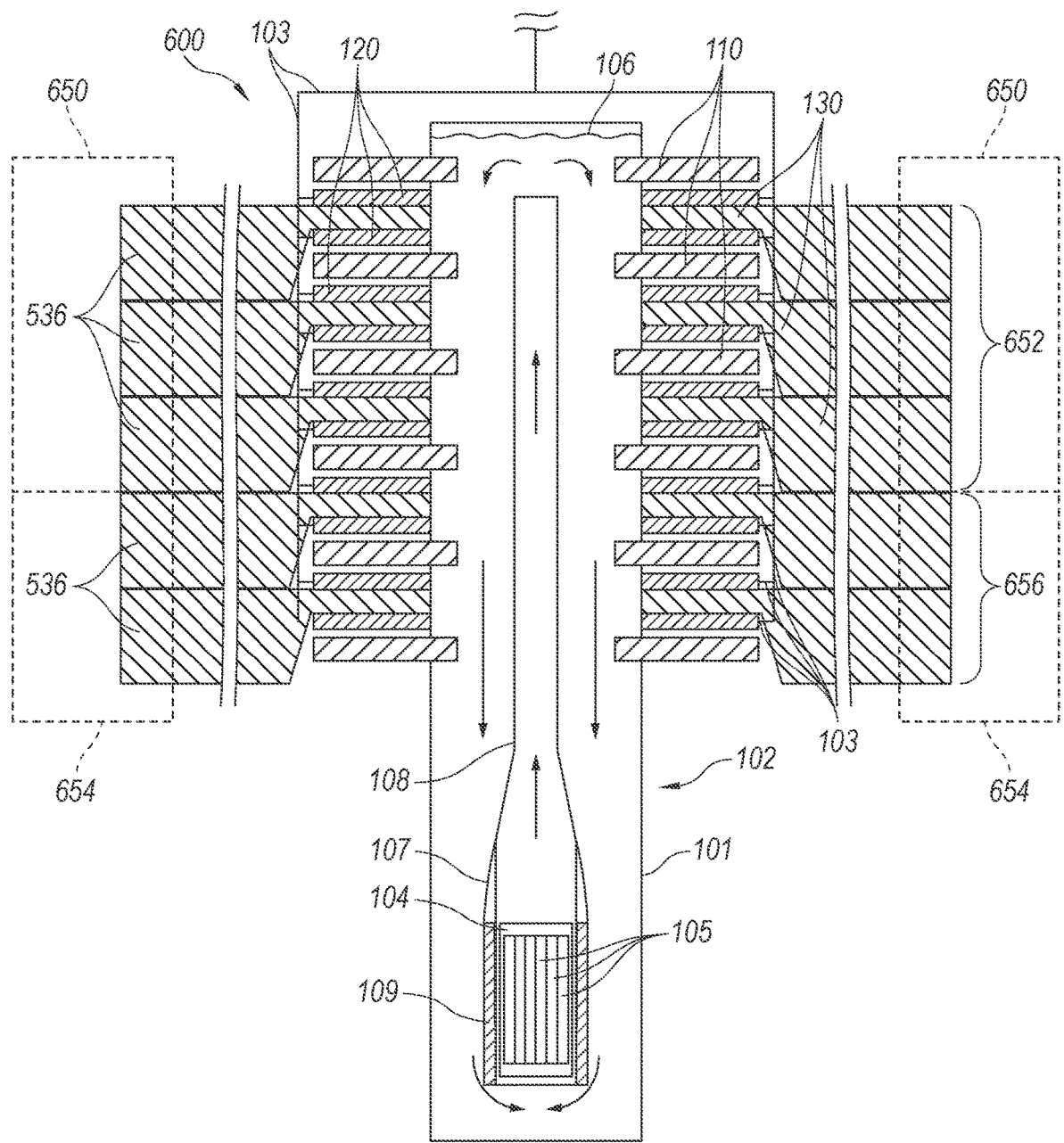
FIG. 6 is a partially schematic side cross-sectional view of a power generation system configured in accordance with additional embodiments of the present technology.

FIG. 6 is a partially schematic side cross-sectional view of a power generation system ("system 600") configured in accordance with additional embodiments of the present technology. The system 600 can include some features that are at least generally similar in structure and function, or identical in structure and function, to the corresponding features of the system 100 described in detail above with reference to FIGS. 1-5C, and can operate in a generally similar or identical manner to the system 100. For example, similar or identical components are identified with the same reference numbers shown in FIGS. 1-5C.

In the illustrated embodiment, however, the system 600 further includes (i) a first heat removal system 650 (shown schematically) thermally coupled to the third regions 536 of a first set 652 of the second heat pipes 130 and (ii) a second heat removal system 654 (shown schematically) thermally coupled to the third regions 536 of a second set 656 of the second heat pipes 130. In the illustrated embodiment, the number of the second heat pipes 130 in the first set 652 is greater than the number of the second heat pipes 130 in the second set 656 while, in other embodiments, the first set 652 can include fewer or the same number of second heat pipes 130 as the second set 656. In some embodiments, the first heat pipes 110 and the TPV cells 120 associated with the second heat pipes 130 in the first set 652 (e.g., in the corresponding groups 140 shown in FIGS. 1-4) can provide a primary power generation function, while the first heat pipes 110 and the TPV cells 120 associated with the second heat pipes 130 in the second set 656 (e.g., in the corresponding groups 140 shown in FIGS. 1-4) can provide for decay heat removal. For example, in the illustrated embodiment the first set 652 is positioned above the second set 656, where the coolant 106 is typically at a higher temperature and can therefore convey more heat and thermal energy to the first heat pipes 110 of the first set 652.

In some embodiments, the first heat removal system 650 can be different than the second heat removal system 654. For example, the first heat removal system 650 can be an active system configured to circulate water, air, other fluids, and/or other heat transfer media past the third regions 536 of the second heat pipes 130 in the first set 652 via active pumping, circulation, etc., while the second heat removal system 654 can be a passive system for removing heat from the third regions 536 of the second heat pipes 130 in the second set 656. In some embodiments, the second heat removal system 654 can be (or can include) a pool of fluid (e.g., water), dirt, air interface, and/or other heat sink configured to passively absorb decay heat from the second heat pipes 130 in the second set 656. In other embodiments, the first and second heat removal systems 650, 654 can comprise the same passive or active heat removal system. In some aspects of the present technology, the second heat removal system 654 can operate to remove heat from the heat source 102 in the event of a loss of power to the first heat removal system 650 (e.g. when the first heat removal system 650 is an active heat removal system). In some aspects of the present technology, the passive operation of the second heat removal system 654 can simplify the design of the system 600 (e.g., thereby increasing reliability) by reducing or eliminating the need for other active heat control systems.

Figure 7:
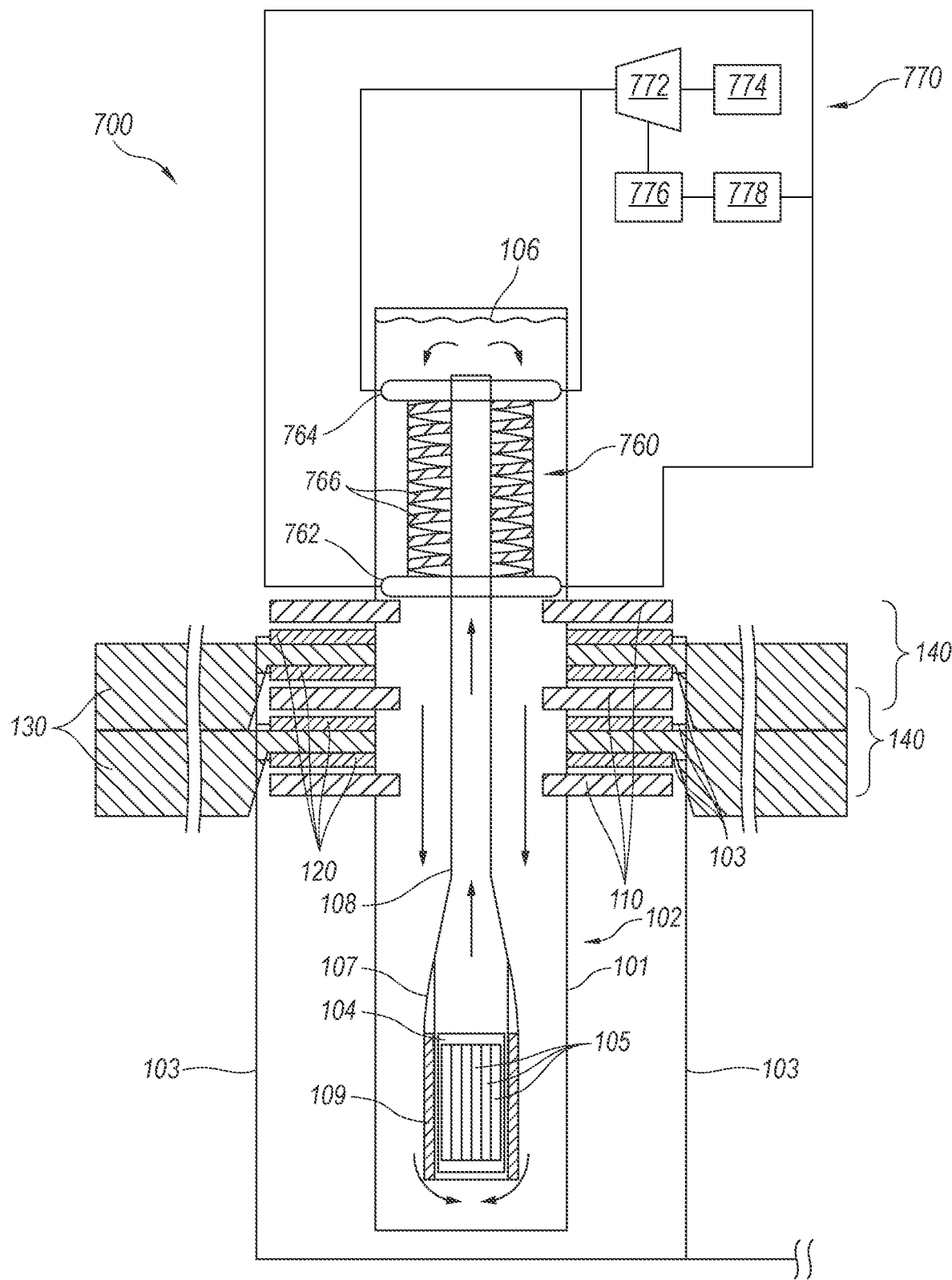
FIG. 7 is a partially schematic side cross-sectional view of a power generation system configured in accordance with additional embodiments of the present technology.

FIG. 7 is a partially schematic side cross-sectional view of a power generation system ("system 700") configured in accordance with additional embodiments of the present technology. The system 700 can include some features that are at least generally similar in structure and function, or identical in structure and function, to the corresponding features of the system 100 and/or the system 600 described in detail above with reference to FIGS. 1-6, and can operate in a generally similar or identical manner to the system 100 and/or the system 600. For example, similar or identical components are identified with the same reference numbers shown in FIGS. 1-6.

In the illustrated embodiment, however, the system 700 further includes a heat exchanger 760, such as a steam generator, containing a secondary coolant or working fluid (e.g., steam and water). The heat exchanger 760 is operably coupled to a power conversion system 770, and configured to heat the secondary coolant and direct the heated secondary coolant to the power conversion system 770 which uses the heat from the secondary coolant to generate electrical power and/or provide other useful outputs. The heat exchanger 760 and the power conversion system 770 can together be referred to as a primary power generation system, a primary power conversion system, and/or the like. In the illustrated embodiment, the heat exchanger 760 includes a first fluid header 762 (e.g., a feedwater header), a second fluid header 764 (e.g., a steam header) above the first fluid header 762, and a multitude of conduits 766 extending between and fluidly coupling the first and second fluid headers 762, 764. In some embodiments, the heat exchanger 760 is positioned around an upper portion of the riser column 108 such that the conduits 766 are arranged circumferentially around the riser tube 108, for example, in a helical pattern as is shown schematically in FIG. 7.

In the illustrated embodiment, the power conversion system 770 includes a turbine 772, a generator 774, a condenser 776, and a pump 778. During operation of the system 700, the primary coolant 106 heated by the reactor core 104 rises through the riser tube 108, then exits the riser tube 108 and passes downwardly past the conduits 766 of the heat exchanger 760—thereby heating the secondary coolant contained within the heat exchanger 760. The heated secondary coolant can rise through the conduits 766 to the second fluid header 764, where the heated secondary coolant is directed to the power conversion system 770. In some embodiments, the secondary coolant can vaporize while rising through the conduits 766. The turbine 772 receives the heated (e.g., vaporized) secondary coolant and converts at least a portion of the thermal energy of the heated secondary coolant to electricity via the generator 774. The secondary coolant can then exit the turbine 772 at a reduced pressure before being be condensed at the condenser 776, and then directed (e.g., via the pump 778) to the first fluid header 762. The secondary coolant then rises through the conduits 766 and is heated once again. In some embodiments, the power conversion system 770 can include one or more valves and/or other fluid control devices (not shown) configured to control the rate of the secondary coolant into the first fluid header 762 and/or out of the second fluid header 764 to thereby control the power generated by the power conversion system 770.

In the illustrated embodiment, the system 700 includes fewer of the groups 140 than the systems 100 and 600 described in detail above with reference to FIGS. 1-6, and the groups 140 are positioned below the heat exchanger 760.

Accordingly, during normal operation of the system 700, the primary coolant 106 can have a higher temperature near, and transfer more thermal energy to, the heat exchanger 760 than the groups 140. In other embodiments, the system 700 can include more or fewer of the groups 140 and/or the groups 140 can be arranged differently. For example, in some embodiments one or more of the groups 140 can additionally or alternatively be positioned adjacent to the heat exchanger 760 (e.g., at the same vertical position along the riser tube 108).

In some embodiments, the heat exchanger 760 and the power conversion system 770 can provide a primary power generation function, while the groups 140 of the first heat pipes 110, the TPV cells 120, and the second heat pipes 130 can provide for decay heat removal. As described in detail above, the groups 140 are configured to passively remove heat from the heat source 102 and are "always on." In some aspects of the present technology, this can reduce the number of controls required for the system 700 while increasing the reliability of the system 700. Additionally, in some embodiments electrical energy generated by the TPV cells 120 can be routed via the electrical lines 103 to power one or more control systems, safety systems, and/or other systems associated with the heat source 102 and/or other components of the system 700. That is, for example, power generated via the power conversion system 770 can be primarily directed to external loads, while power generated via the TPV cells 120 can be primarily directed to loads associated with operation of the system 700. In some aspects of the present technology, due to the passive and continuous removal of decay heat provided by the groups 140, the power generated via the TPV cells 120 is reliable and can be continuously provided in the event of a failure of the primary power conversion system 770. In additional aspects of the present technology, the TPV cells 120 can continuously generate power even where the heat source 102 is operating at a minimum power level (e.g., when the reactor core 104 operates at close to hot zero power). In some aspects of the present technology, this power can be used to facilitate easy restart of the reactor 104.

Figure 8:
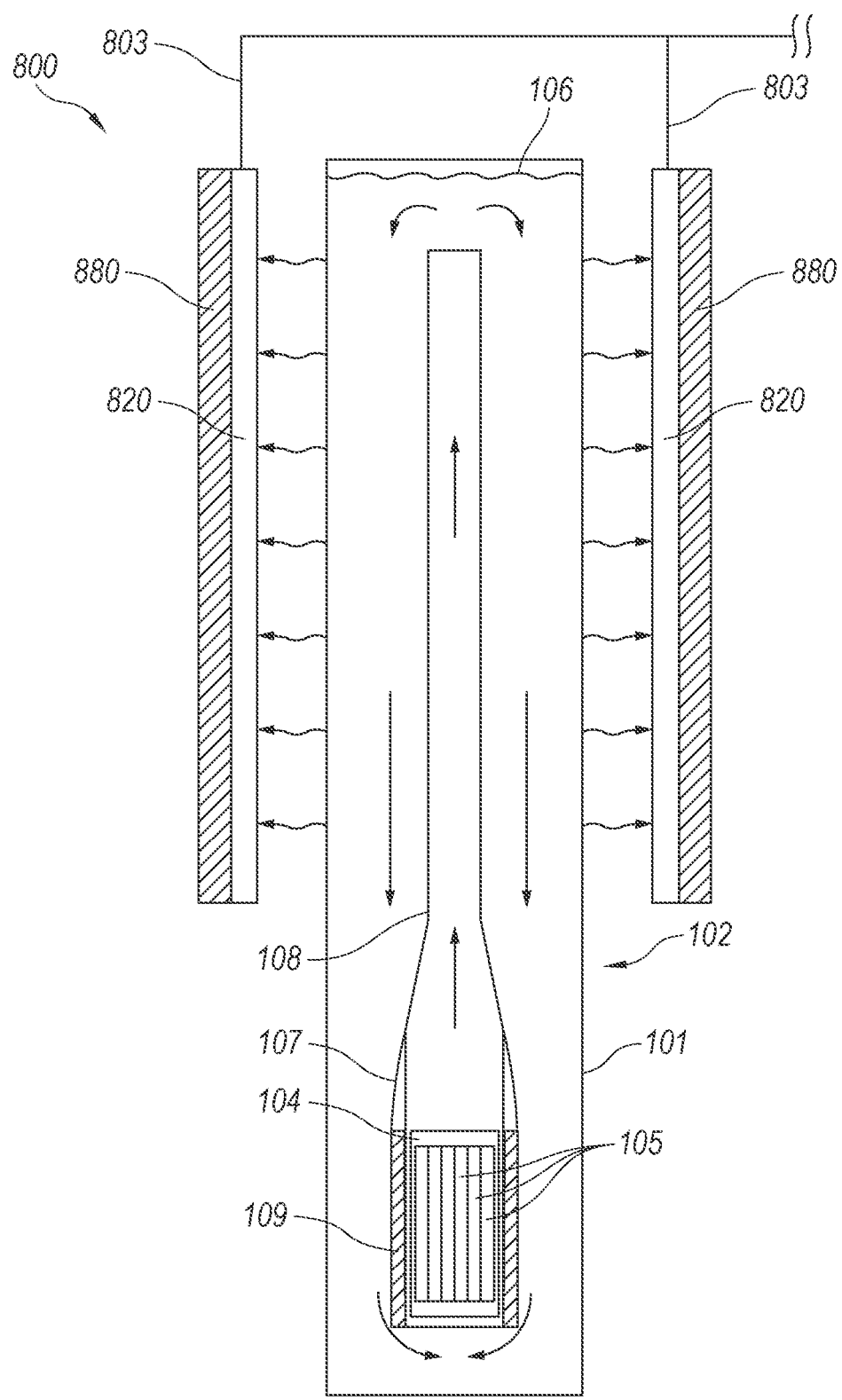
FIG. 8 is a side cross-sectional view of a power generation system configured in accordance with additional embodiments of the present technology.

FIG. 8 is a side cross-sectional view of a power generation system ("system 800") configured in accordance with additional embodiments of the present technology. The system 800 can include some features that are at least generally similar in structure and function, or identical in structure and function, to the corresponding features of the systems 100, 600, and/or 700 described in detail above with reference to FIGS. 1-7, and can operate in a generally similar or identical manner to the systems 100, 600, and/or 700. For example, similar or identical components are identified with the same reference numbers shown in FIGS. 1-7.

In the illustrated embodiment, however, the system 800 includes one or more TPV cells 820 positioned outside the heat source 102 and face the reactor vessel 101. In some embodiments, the coolant 106 heated by reactor core 104 can heat the reactor vessel 101, which radiates the heat toward the TPV cells 820 (e.g., as indicated by arrows in FIG. 8). The TPV cells 820 are positioned to absorb the thermal radiation from the reactor vessel 101 and configured to convert the thermal radiation to electrical energy for transmission on one or more electrical lines 803. In some embodiments, the system 800 can further include a heat removal system 880 thermally coupled to the TPV cells 820 and configured to remove waste heat from the TPV cells 820 to thereby maintain the TPV cells 820 at or below a maximum operating temperature. The heat removal system 880 can include an active or passive air, water, and/or other fluid-cooled system, and/or can include one or more heat pipes thermally coupled to the TPV cells 820. Accordingly, in the illustrated embodiment the rector vessel 101 can directly radiate thermal energy to the TPV cells 120 and therefore need not include any intermediate heat pipes (e.g., the first heat pipes 110 of FIGS. 1-7) for removing and radiating the thermal energy from within the reactor vessel 101. In other embodiments, the TPV cells 820 can be positioned to receive thermal energy radiated from the reactor vessel 101 while the system 800 further includes one or more intermediate heat pipes. That is for example, the TPV cells 820 and the associated heat removal system 880 can be positioned around any of the systems 100, 600, and/or 700 described in detail above to provide for additional power generation. For example, the arrangement of the TPV cells 820 can be used for passive/decay heat power conversion, while the heat exchanger 760 and power conversion system 770 of FIG. 7 provide for primary power generation.

The following examples are illustrative of several embodiments of the present technology:

1. A nuclear power generation system, comprising:
   a nuclear reactor including a reactor core positioned within a reactor vessel, wherein the reactor core is configured to generate heat;
   a surface positioned to receive the heat from the reactor core, wherein the surface is positioned to radiate at least a portion of the received heat away from the surface as thermal radiation; and
   a thermophotovoltaic cell positioned to receive the thermal radiation from the surface and to convert at least a portion of the thermal radiation to electrical energy.

2. The nuclear power generation system of example 1, further comprising a heat pipe having a first region and a second region, wherein the first region is configured to receive the heat from the reactor core, and wherein the second region includes the surface.

3. The nuclear power generation system of example 2 wherein the heat pipe is one of a plurality of first heat pipes each having the first region and the second region, wherein the thermophotovoltaic cell is one of a plurality of thermophotovoltaic cells, wherein individual ones of the thermophotovoltaic cells are positioned to receive the thermal radiation from the surface of the second region of a corresponding one of the first heat pipes and to convert at least a portion of the thermal radiation to electrical energy, wherein the first regions of the first heat pipes are positioned at least partially within the reactor vessel, wherein the second regions of the first heat pipes are positioned at least partially outside the reactor vessel, and further comprising:
   a plurality of second heat pipes, wherein individual ones of the second heat pipes are thermally coupled to one or more of the thermophotovoltaic cells and positioned to transfer heat away from the one or more of the thermophotovoltaic cells.

4. The nuclear power generation system of example 2 or example 3 wherein the heat pipe is a first heat pipe, and further comprising a second heat pipe thermally coupled to the thermophotovoltaic cell, wherein the second heat pipe is positioned to transfer heat away from the thermophotovoltaic cell.

5. The nuclear power generation system of example 4 wherein the thermophotovoltaic cell is spaced apart from the first heat pipe and mounted to the second heat pipe.

6. The nuclear power generation system of example 4 or example 5 wherein the second heat pipe has a first region and a second region, wherein the thermophotovoltaic cell is mounted to the first region of the second heat pipe, and wherein the second region of the second heat pipe is positioned to transfer heat to a heat sink.
7. The nuclear power generation system of example 6 wherein the second region of the first heat pipe, the thermophotovoltaic cell, and the first region of the second heat pipe are superimposed with one another.
8. The nuclear power generation system of example 6 or example 7 wherein the second region of the first heat pipe, the thermophotovoltaic cell, and the first region each have at least approximately same planform shape.
9. The nuclear power generation system of any one of examples 2-8 wherein the second region of the heat pipe has a trapezoidal cross-sectional shape.
10. The nuclear power generation system of example 9 wherein the thermophotovoltaic cell has a substantially similar trapezoidal cross-sectional shape, and wherein the thermophotovoltaic cell is superimposed with the second region of the heat pipe.
11. A nuclear power generation system, comprising:
a nuclear reactor having a reactor core configured to generate heat;
multiple heat pipes positioned to absorb heat from the reactor core and to radiate at least a portion of the heat away from the heat pipes as thermal radiation; and
multiple thermophotovoltaic cells positioned to absorb the thermal radiation from one or more of the heat pipes and to convert at least a portion of the thermal radiation to electrical energy.
12. The nuclear power generation system of example 11 wherein the nuclear reactor includes a reactor vessel housing the reactor core, wherein the heat pipes are arranged in a stack relative to the reactor vessel, and wherein at least one of the thermophotovoltaic cells is positioned between each pair of adjacent ones of the heat pipes in the stack.
13. The nuclear power generation system of example 12 wherein the heat pipes each include a first region positioned to absorb heat from the reactor core and a second region positioned to radiate the thermal radiation, wherein the second regions of the heat pipes and the thermophotovoltaic cells have a substantially same shape and size, and wherein the second regions are superimposed with the thermophotovoltaic cells.
14. The nuclear power generation system of any one of examples 11-13 wherein the nuclear reactor includes a reactor vessel housing the reactor core, wherein the heat pipes are arranged in a stack relative to the reactor vessel, wherein two of the thermophotovoltaic cells are positioned between each pair of adjacent ones of the heat pipes in the stack, wherein a first one of the two thermophotovoltaic cells faces a first one of the pair of adjacent ones of the heat pipes, and wherein a second one of the two thermophotovoltaic cells faces a second one of the pair of adjacent ones of the heat pipes.
15. The nuclear power generation system of example 14 wherein the heat pipes are first heat pipes, wherein the nuclear power generation system further comprises multiple second heat pipes, wherein one of the second heat pipes is positioned between each pair of adjacent ones of the heat pipes in the stack, and wherein the two thermophotovoltaic cells are mounted to the one of the second heat pipes positioned between the pair of adjacent ones of the heat pipes.
16. The nuclear power generation system of any one of examples 11-15 wherein the nuclear reactor includes a reactor vessel housing the reactor core, wherein the heat pipes are positioned circumferentially about the reactor vessel, and wherein the thermophotovoltaic cells are positioned circumferentially about the reactor vessel and superimposed with corresponding ones of the second heat pipes.
17. The nuclear power generation system of any one of examples 11-16 wherein the nuclear reactor includes a reactor vessel housing the reactor core, wherein the heat pipes and the thermophotovoltaic cells are arranged into a plurality of groups arranged vertically and circumferentially about the reactor vessel, and wherein each of the groups includes (a) at least one of the heat pipes and (b) at least one of the thermophotovoltaic cells positioned to absorb the thermal radiation from the at least one of the heat pipes.
18. A method of generating power, the method comprising:
absorbing heat generated by a reactor core of a nuclear reactor at a first region of a heat pipe;
radiating at least a portion of the heat as thermal radiation from a second region of the heat pipe;
receiving the thermal radiation at a thermophotovoltaic cell; and
converting at least a portion of the thermal radiation to electrical energy at the thermophotovoltaic cell.
19. The method of example 18 wherein the heat pipe is a first heat pipe, and wherein the method further comprises transferring waste heat away from the thermophotovoltaic cell with a second heat pipe.
20. The method of example 18 or example 19 wherein the method further comprises
absorbing heat from the reactor core with a coolant; and
flowing the coolant past a portion of the heat pipe.
21. A power generation system, comprising:
a heat pipe having a first region and a second region, wherein the first region is configured to absorb heat from a heat source, and wherein the second region is configured to radiate at least a portion of the absorbed heat away from the heat pipe as thermal radiation; and
a thermophotovoltaic cell positioned to receive the thermal radiation from the second region of the heat pipe and to convert at least a portion of the thermal radiation to electrical energy.
22. The power generation system of example 21 wherein the heat pipe is a first heat pipe, and further comprising a second heat pipe thermally coupled to the thermophotovoltaic cell, wherein the second heat pipe is positioned to transfer heat away from the thermophotovoltaic cell.
23. The power generation system of example 22 wherein the thermophotovoltaic cell is spaced apart from the first heat pipe and mounted to the second heat pipe.
24. The power generation system of example 22 or example 23 wherein the second heat pipe has a first region and a second region, wherein the thermophotovoltaic cell is mounted to the first region of the second heat pipe, and wherein the second region of the second heat pipe is positioned to transfer heat to a heat sink.
25. The power generation system of example 24 wherein the second region of the first heat pipe, the thermopho- 26. The power generation system of example 24 or example 25 wherein the second region of the first heat pipe, the thermophotovoltaic cell, and the first region each have at least approximately same planform shape.
27. The power generation system of any one of examples 21-26 wherein the second region of the heat pipe has a trapezoidal cross-sectional shape.
28. The power generation system of example 27 wherein the thermophotovoltaic cell has a substantially similar trapezoidal cross-sectional shape, and wherein the thermophotovoltaic cell is superimposed with the second region of the heat pipe.
29. The power generation system of any one of examples 21-28, further comprising the heat source.
30. The power generation system of any one of examples 21-29 wherein the heat source includes a nuclear reactor.
11. A power generation system, comprising:
   a heat source;
   multiple heat pipes positioned to absorb heat from the heat source and to radiate at least a portion of the heat away from the heat pipes as thermal radiation; and
   multiple thermophotovoltaic cells positioned to absorb the thermal radiation from one or more of the heat pipes and to convert at least a portion of the thermal radiation to electrical energy.
32. The power generation system of example 31 wherein the heat pipes are arranged in a stack relative to the heat source, and wherein at least one of the thermophotovoltaic cells is positioned between each pair of adjacent ones of the heat pipes in the stack.
33. The power generation system of example 32 wherein the heat pipes each include a first region positioned to absorb heat from the heat source and a second region positioned to radiate the thermal radiation, wherein the second regions of the heat pipes and the thermophotovoltaic cells have a substantially same shape and size, and wherein the second regions are superimposed with the thermophotovoltaic cells.
34. The power generation system of any of examples 31-33 wherein the heat pipes are arranged in a stack relative to the heat source, wherein two of the thermophotovoltaic cells are positioned between each pair of adjacent ones of the heat pipes in the stack, wherein a first one of the two thermophotovoltaic cells faces a first one of the pair of adjacent ones of the heat pipes, and wherein a second one of the two thermophotovoltaic cells faces a second one of the pair of adjacent ones of the heat pipes.
35. The power generation system of example 34 wherein the heat pipes are first heat pipes, wherein the power generation system further comprises multiple second heat pipes, wherein one of the second heat pipes is positioned between each pair of adjacent ones of the heat pipes in the stack, and wherein the two thermophotovoltaic cells are mounted to the one of the second heat pipes positioned between the pair of adjacent ones of the heat pipes.
36. The power generation system of any one of examples 31-35 wherein the heat pipes are positioned circumferentially about the heat source, and wherein the thermophotovoltaic cells are positioned circumferentially about the heat source and superimposed with corresponding ones of the second heat pipes.
37. The power generation system of any one of examples 31-36 wherein the heat pipes and the thermophotovoltaic cells are arranged into a plurality of groups arranged vertically and circumferentially about the heat source, wherein each of the groups includes (a) at least one of the heat pipes and (b) at least one of the thermophotovoltaic cells positioned to absorb the thermal radiation from the at least one of the heat pipes.
38. A method of generating power, the method comprising:
   absorbing heat from a heat source at a first region of a heat pipe;
   radiating at least a portion of the heat as thermal radiation from a second region of the heat pipe;
   receiving the thermal radiation at a thermophotovoltaic cell; and
   converting at least a portion of the thermal radiation to electrical energy at the thermophotovoltaic cell.
39. The method of example 38 wherein the heat pipe is a first heat pipe, and wherein the method further comprises transferring waste heat away from the thermophotovoltaic cell with a second heat pipe.
40. The method of example 38 or example 39 wherein the method further comprises generating the heat in the heat source via a nuclear reaction.
41. A nuclear power generation system, comprising:
   a nuclear reactor including a reactor core positioned within a reactor vessel;
   a plurality of first heat pipes, wherein individual ones of the first heat pipes include a first region and a second region, wherein the first region is positioned at least partially within the reactor vessel and configured to absorb heat generated by the reactor core, and wherein the second region is positioned at least partially outside the reactor vessel and configured to radiate at least a portion of the absorbed heat away from the first heat pipe as thermal radiation;
   a plurality of thermophotovoltaic cells, wherein individual ones of the thermophotovoltaic cells are positioned to receive the thermal radiation from the second region of a corresponding on the first heat pipes and to convert at least a portion of the thermal radiation to electrical energy; and
   a plurality of second heat pipes, wherein individual ones of the second heat pipes are thermally coupled to one or more of the thermophotovoltaic cells and positioned to transfer heat away from the one or more of the thermophotovoltaic cells.

The above detailed description of embodiments of the present technology are not intended to be exhaustive or to limit the technology to the precise forms disclosed above. Although specific embodiments of, and examples for, the technology are described above for illustrative purposes, various equivalent modifications are possible within the scope of the technology as those skilled in the relevant art will recognize. For example, although steps are presented in a given order, other embodiments may perform steps in a different order. The various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively.

As used herein, the phrase "and/or" as in "A and/or B" refers to A alone, B alone, and A and B. To the extent any materials incorporated herein by reference conflict with the present disclosure, the present disclosure controls. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with some embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A nuclear power generation system, comprising:
   a nuclear reactor including a reactor core positioned within a reactor vessel, the reactor core being configured to generate heat;
   a first heat pipe including a surface configured to receive the heat from the reactor core, and to radiate at least a portion of the received heat away from the surface as thermal radiation;
   a thermophotovoltaic cell configured to receive the thermal radiation from the surface and to convert at least a portion of the thermal radiation to electrical energy; and
   a second heat pipe coupled to the thermophotovoltaic cell and configured to transfer heat away from the thermophotovoltaic cell.

2. The nuclear power generation system of claim 1, wherein the first heat pipe is one of a plurality of first heat pipes, wherein the thermophotovoltaic cell is one of a plurality of thermophotovoltaic cells, wherein individual ones of the thermophotovoltaic cells are coupled to the surface of a corresponding one of the first heat pipes, wherein first regions of the first heat pipes are positioned at least partially within the reactor vessel, and wherein second regions of the first heat pipes are positioned at least partially outside the reactor vessel, further comprising:
   a plurality of second heat pipes, wherein individual ones of the second heat pipes are thermally-coupled to one or more of the thermophotovoltaic cells.

3. The nuclear power generation system of claim 1, wherein the thermophotovoltaic cell is spaced apart from the first heat pipe and mounted to the second heat pipe.

4. The nuclear power generation system of claim 1, wherein the second heat pipe has a first region and a second region, wherein the thermophotovoltaic cell is mounted to the first region, and wherein the second region is coupled to a heat sink.

5. The nuclear power generation system of claim 4, wherein, the thermophotovoltaic cell, the first region of the second heat pipe, and a third region of the first heat pipe are superimposed in a vertical direction with one another.

6. The nuclear power generation system of claim 4, wherein, the thermophotovoltaic cell, the first region of the second heat pipe, and a third region of the first heat pipe each have a trapezoidal planform shape.

7. The nuclear power generation system of claim 1, wherein a region of the first heat pipe has a trapezoidal cross-sectional shape.

8. The nuclear power generation system of claim 7, wherein the thermophotovoltaic cell has the trapezoidal cross-sectional shape, and wherein the thermophotovoltaic cell is superimposed in a vertical direction with the region of the first heat pipe.

9. A nuclear power generation system, comprising:
   a nuclear reactor having a reactor core configured to generate heat;
   multiple first heat pipes coupled the reactor core and configured to absorb the heat from the reactor core;
   multiple thermophotovoltaic cells coupled to one or more of the first heat pipes, the thermophotovoltaic cells being configured to absorb thermal radiation from the one or more of the first heat pipes and to convert at least a portion of the thermal radiation to electrical energy; and
   multiple second heat pipes coupled to one or more of the thermophotovoltaic cells and configured to transfer heat away from the thermophotovoltaic cells.

10. The nuclear power generation system of claim 9, wherein the nuclear reactor includes a reactor vessel housing the reactor core, wherein the first heat pipes are coupled to the reactor vessel and arranged in a stack in a vertical direction, and wherein at least one of the thermophotovoltaic cells is positioned between each pair of adjacent ones of the first heat pipes.

11. The nuclear power generation system of claim 10, wherein individual ones of the first heat pipes each include a first region configured to absorb the heat from the reactor core and a second region configured to radiate the thermal radiation, wherein the second regions and the thermophotovoltaic cells have a trapezoidal shape and a same surface size, and wherein the second regions are superimposed with the thermophotovoltaic cells in the vertical direction.

12. The nuclear power generation system of claim 9, wherein the nuclear reactor includes a reactor vessel housing the reactor core, wherein the first heat pipes are coupled to the reactor vessel and arranged in a stack in a vertical direction, wherein two of the thermophotovoltaic cells are positioned between each pair of adjacent ones of the first heat pipes in the stack, wherein a first one of the two thermophotovoltaic cells faces a first one of the pair of adjacent ones of the first heat pipes, and wherein a second one of the two thermophotovoltaic cells faces a second one of the pair of adjacent ones of the first heat pipes.

13. The nuclear power generation system of claim 12, wherein one of the second heat pipes is positioned between each pair of adjacent ones of the first heat pipes, and wherein the two thermophotovoltaic cells are mounted to the one of the second heat pipes positioned between the pair of adjacent ones of the first heat pipes.

14. The nuclear power generation system of claim 9, wherein the nuclear reactor includes a cylindrical reactor vessel housing the reactor core, wherein the first heat pipes are positioned circumferentially about the cylindrical reactor vessel, and wherein the thermophotovoltaic cells are positioned circumferentially about the cylindrical reactor vessel and superimposed with corresponding ones of the second heat pipes in a vertical direction.

15. The nuclear power generation system of claim 9, wherein the nuclear reactor includes a reactor vessel housing the reactor core, wherein the first heat pipes and the thermophotovoltaic cells are arranged into a plurality of groups arranged vertically and circumferentially about the reactor vessel, and wherein each of the groups includes (a) at least one of the first heat pipes and (b) at least one of the thermophotovoltaic cells.

16. A nuclear power generation system, comprising:
a nuclear reactor including a reactor core positioned within a reactor vessel;
multiple first heat pipes, individual ones of the first heat pipes including with a first region and a second region, the first regions being positioned at least partially within the reactor vessel, the second regions being positioned at least partially outside the reactor vessel;
multiple thermophotovoltaic cells coupled to one or more of the first heat pipes; and
multiple second heat pipes coupled to one or more of the thermophotovoltaic cells.

17. The nuclear power generation system of claim 16, wherein the thermophotovoltaic cells are spaced apart from the first heat pipes and mounted to the second heat pipes.

18. The nuclear power generation system of claim 16, wherein the second regions have a trapezoidal cross-sectional shape.

* * * * *